(12) United States Patent
Silverman et al.

(10) Patent No.: US 12,713,462 B2
(45) Date of Patent: Aug. 18, 2026

(54) ADDING CONTROL OR MANAGEMENT DATA TO BLOCK ACKNOWLEDGE OR PROTOCOL DATA UNIT

(71) Applicant: Cisco Technology, Inc., San Jose, CA (US)

(72) Inventors: Matthew A. Silverman, Shaker Heights, OH (US); Brian D. Hart, Sunnyvale, CA (US); Ardalan Alizadeh, Milpitas, CA (US); Robert E. Barton, Richmond (CA); Jerome Henry, Pittsboro, NC (US); Juan Carlos Zuniga, Montreal (CA); Malcolm M. Smith, Richardson, TX (US); Scott R. Blue, Oulu (FI); John M. Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 698 days.

(21) Appl. No.: 18/150,691

(22) Filed: Jan. 5, 2023

(65) Prior Publication Data

US 2024/0015788 A1 Jan. 11, 2024

Related U.S. Application Data

(60) Provisional application No. 63/368,014, filed on Jul. 8, 2022.

(51) Int. Cl.
*H04W 74/08* (2024.01)
*H04L 1/00* (2006.01)
(Continued)

(52) U.S. Cl.
CPC ....... *H04W 74/0816* (2013.01); *H04L 1/0058* (2013.01); *H04L 5/0007* (2013.01); *H04L 5/0055* (2013.01)

(58) Field of Classification Search
CPC .. H04W 74/0816; H04W 84/12; H04L 1/1685
See application file for complete search history.

(56) References Cited

U.S. PATENT DOCUMENTS 9,949,290 B2 4/2018 Seok
10,368,269 B2 * 7/2019 Seok .................... H04B 7/0697
(Continued)

FOREIGN PATENT DOCUMENTS

WO 2018016313 A1 1/2018
WO 2020096895 A1 5/2020
(Continued)

OTHER PUBLICATIONS

How I Wi-Fi, 802.11 Frame Types and Formats, <https://howiwifi.com/2020/07/13/802-11-frame-types-and-formats/>.
(Continued)

*Primary Examiner* — Derrick W Ferris
*Assistant Examiner* — Won Jun Choi
(74) *Attorney, Agent, or Firm* — Patterson + Sheridan, LLP

(57) ABSTRACT

Disclosed methods and systems for efficiently gathering reports from stations coupled to an access point via a wireless network. In some cases, the reports may be attached to block acknowledge frames, which often occur. Alternatively, when multiple stations operate with assigned resource units during a transmission opportunity (TXOP), the reports are embedded in the spare capacity of a physical protocol data units used during the TXOP.

14 Claims, 10 Drawing Sheets

(51) Int. Cl.
*H04L 5/00* (2006.01)
*H04W 74/0816* (2024.01)

(56) References Cited

U.S. PATENT DOCUMENTS

2012/0140756 A1 6/2012 Rudolf et al.
2014/0233551 A1 8/2014 Wentink et al.
2016/0227560 A1* 8/2016 Webb .................. H04W 72/569
2016/0278139 A1* 9/2016 Lei ........................ H04W 76/12
2016/0330759 A1 11/2016 Hirsch et al.
2017/0163776 A1 6/2017 Seok et al.
2018/0175991 A1* 6/2018 Son ....................... H04L 1/1685
2020/0322105 A1* 10/2020 Chitrakar ................ H04L 1/188
2021/0360623 A1 11/2021 Noh et al.

FOREIGN PATENT DOCUMENTS

WO WO2022068457 * 4/2022 ............ H04W 28/02
WO WO-2022068457 A1 * 4/2022 ............ H04W 28/02

OTHER PUBLICATIONS

SlidePlayer, Adding control trailer to control mode PPDUs, Jan. 17, 2016, https://slideplayer.com/slide/15905433/>.

A hyperconnected world and the next generation Wi-Fi (802.11ax) Pablo Aguilera, ISBN 9781981002726.

802.11 Wireless Networks, Mathew Gast, 2nd edition, ISBN 9780596100520.

Au E., "Specification Framework for TGbe", IEEE Draft, 11-19-1262-22-00BE-Specification-framework-for-TGbe, IEEE-SA Mentor, Piscataway, NJ, USA, vol. 802.11 EHT, 802.11be, No. 22, Jan. 6, 2021, XP068175643, 105 Pages.

International Search Report and Written Opinion for International Application No. PCT/US2023/069616, mailed Sep. 28, 2023, 14 Pages.

* cited by examiner

Aggregate MAC protocol data unit 270
MPDU-1 272
MPDU-2 274
MPDU-3 276
272a
272b
272c
272d
274a
274b
274c
274d
276a
276b
276c
276d
PHY header
MAC header
MSDU-1 payload
Trailer
PHY header
MAC header
MSDU-1 payload
Trailer
PHY header
MAC header
MSDU-1 payload
Trailer

ADDING CONTROL OR MANAGEMENT DATA TO BLOCK ACKNOWLEDGE OR PROTOCOL DATA UNIT

CROSS-REFERENCE TO RELATED APPLICATIONS

This application claims the benefit of U.S. provisional patent application Ser. No. 63/368,014 filed Jul. 8, 2022. The aforementioned related patent application is herein incorporated by reference in its entirety.

TECHNICAL FIELD

Embodiments presented in this disclosure generally relate to obtaining information from stations in a wireless network. More specifically, embodiments disclosed herein relate to an access point efficiently obtaining reports from stations coupled to a wireless network so that upper network layers can operate more efficiently.

BACKGROUND

A network typically has several protocol layers for handling messages between applications in different endpoints. Transferring these messages is performed by an ordered stack of layers, including the transport layer, the network layer, the data link layer, and the physical layer.

The transport layer carries the messages between applications as segments.

The network layer carries the segments as datagrams. In software-defined networking, the network layer is partitioned into a data plane, which handles the physical routing of the datagrams, and a control plane/management plane, which provides the routing algorithms for routing the datagrams.

The link layer carries the network layer datagrams as frames. It includes a medium access control (MAC) sublayer above the physical layer when the network medium is a shared access medium, such as a wireless network. The MAC layer operates with a protocol to share the common medium.

The physical layer carries the link layer frames as bits that are converted into symbols modulated on tones in the baseband, which then modulates a high-frequency carrier.

Efficiency improvements have been implemented in the physical layer and MAC layer of a protocol, but the upper networking layers, such as the control and management planes in the network layer, have no knowledge of the improvements and thus interfere with or are unable to use the efficiency improvements. Thus, there is a need to report information to the upper networking layers so that the upper layers can take advantage of the improvements.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
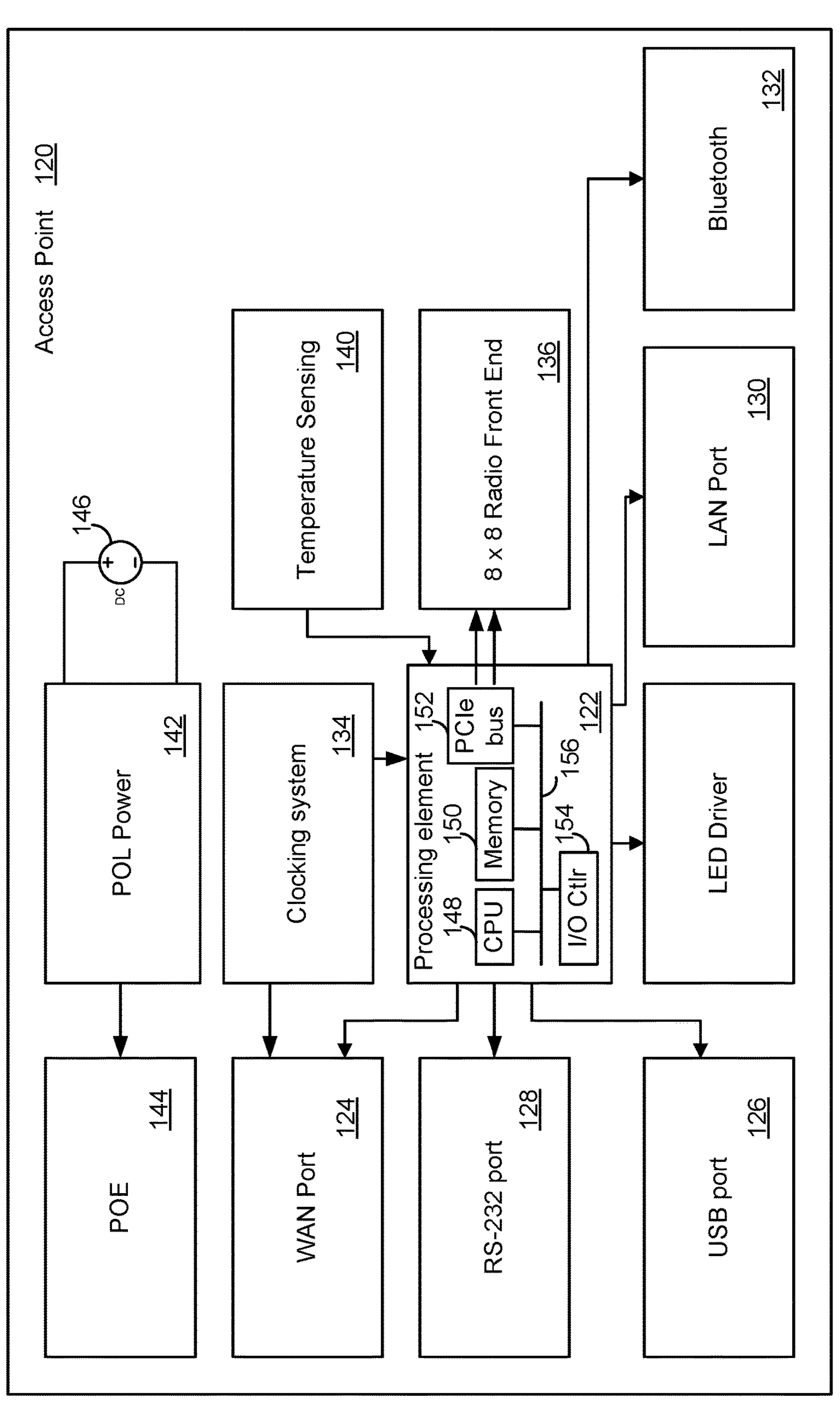
FIG. 1 depicts a representative access point (AP) architecture.

One embodiment presented in this disclosure is a method of providing information to an access point. The method includes sending a management frame to a station, where the management frame specifies one or more reports regarding the operation of the station connected to the access point, and receiving the one or more reports from the station, where the one or more reports are appended to a block acknowledgment or are included in a spare capacity of a physical protocol data unit (PPDU) sent by the station to the access point.

Another embodiment is a system for providing information to an access point. The system includes a wireless medium, an access point coupled to the wireless medium, and one or more stations coupled to the access point via the wireless medium. The access point is configured to: send a management frame to a station over the wireless medium, where the management frame specifies one or more reports, and the one or more reports pertain to the operation of the station connected to the access point, send a request for the one or more reports specified in the management frame, and receive the one or more reports from the station, where the one or more reports are appended to a block acknowledgment or are included in a spare capacity of a physical protocol data unit (PPDU) sent by the station to the access point.

Yet another embodiment is a non-transitory computer-readable medium encoding instructions, which, when executed by a processor of an access point coupled to a wireless medium, cause the access point to: send a management frame to a station, where the management frame specifies one or more reports and the one or more reports pertain to the operation of the station connected to the access point, send a request for the one or more reports specified in the management frame; and receive the one or more reports from the station, where the one or more reports are appended to a block acknowledgment or are included in a spare capacity of a physical protocol data unit (PPDU) sent by the station to the access point.

EXAMPLE EMBODIMENTS

A network protocol stack includes an application layer, a transport layer, a network layer, a data link layer, and a physical layer. The transport layer provides the application layer with messages allowing the applications at different endpoints to communicate. The network layer provides datagrams that transfer the messages of the transport layer, while the data link layer transfers the datagrams as frames, and the physical layer transfers the frames as data bits. Improvements in the data link layer and physical layer reduce the number of data link layer frames and physical layer bits, but the networking and transport layers cannot take advantage of these improvements because they lack information as to whether they are employed and when they occur in the data link and physical layers. Providing information via the access point to the network and transport layers allows those layers to take advantage of the improvements in the data link and physical layers.

New wireless protocols provide several improvements in efficiency at the MAC layer. Having an access point report the effects of these improvements to the upper networking layers allows the upper layers to take advantage of the improvements. Attaching the requisite reports to block acknowledgments (BA) or inserting the reports into the spare capacity of a physical protocol data unit (PPDU) provides the needed information to the access point without substantially affecting performance at the MAC layer.

FIG. 1 depicts a representative architecture of an access point. The access point 120 includes a processing element 122 and several ports or connection facilities, such as a WAN port 124, USB port 126, RS-232 port 128, LAN port 130, and Bluetooth 132. Also included are a clocking system 134 and an 8×8 radio front-end 136 with a transmitter and receiver, which are coupled to eight external antennas. Auxiliary modules include a temperature sensing module 140, a power module 142 connected to a DC power source 146, and a power over Ethernet (POE) module 144. The processing system includes a CPU 148 and memory 150, a peripheral component interconnect express (PCle) bus controller 152 for connecting to the radio front-end 136, and an I/O controller 154, all coupled to each other via bus 156.

The AP implements the physical layer of 802.11ax specification, adding two new features to the wireless protocol: multi-user multiple-input, multiple output (MU-MIMO) radio links, and orthogonal frequency division multiple access (OFDMA) modulation.

MU-MIMO allows parallelism in the spatial domain. In MU-MIMO, multiple transmitters and receivers can operate simultaneously during the same transmission opportunity (TXOP). MU-MIMO supports up to 8 simultaneous transmissions and is well-suited to large data packets.

In OFDMA, the spectrum is organized into a set of operating channels. Each channel comprises subcarriers, with some of the subcarriers used as pilot carriers and the others for carrying data. Each subcarrier (called a tone) is modulated by quadrature amplitude modulation (QAM). In addition, the subcarriers of a channel are assigned to groups called resource units (RUs), which can be operated independently of each other. Thus, a 20 MHz channel can communicate with a single station or client or up to nine stations or clients simultaneously, each having its own RU. The number of simultaneous transmissions can vary per TXOP.

To handle the new capabilities of OFDMA and MU-MIMO, a number of new data frames, called HE frames, are included in the protocol standard.

Figure 2A:
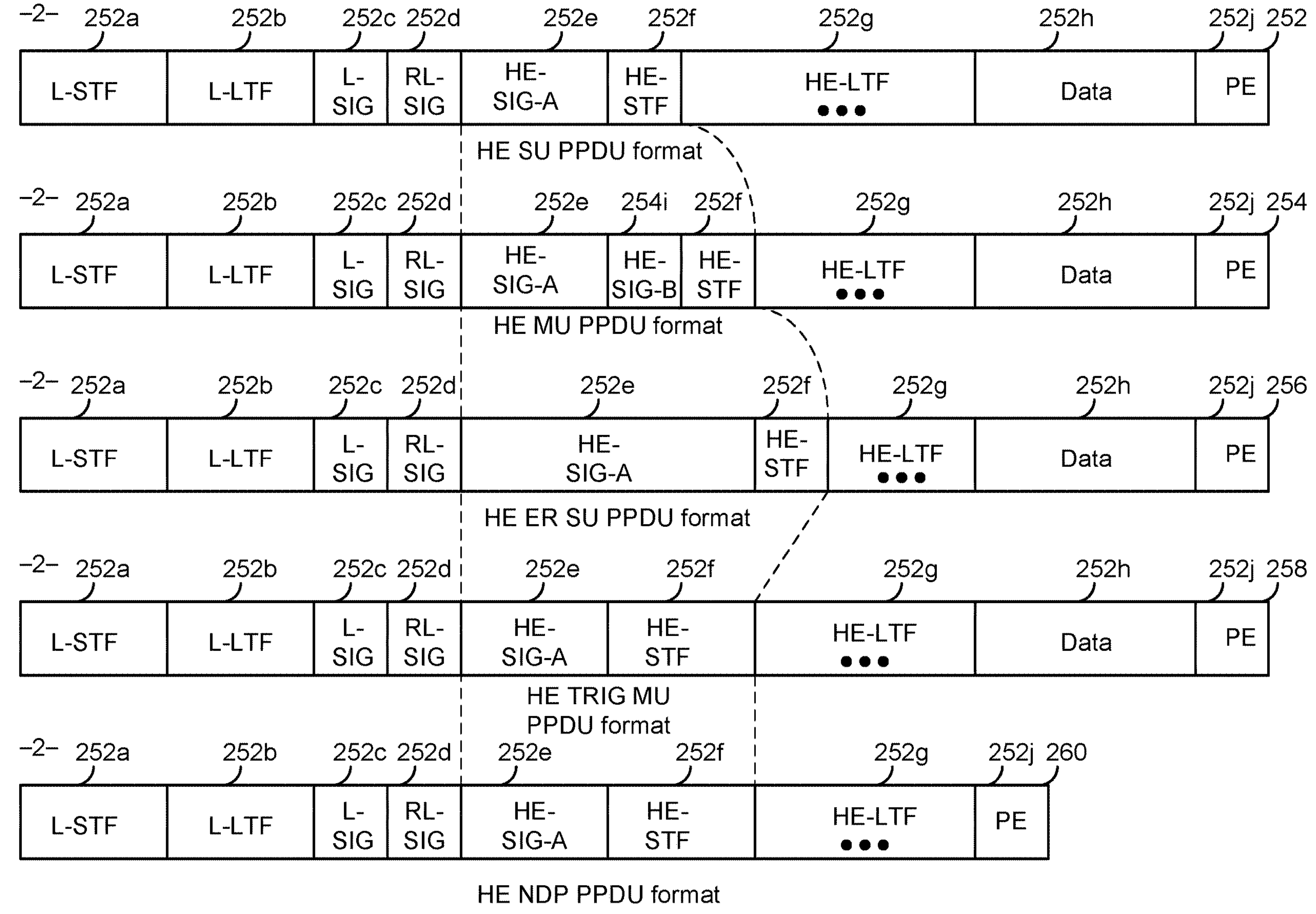
FIG. 2A depicts physical layer frames.
Figure 2B:
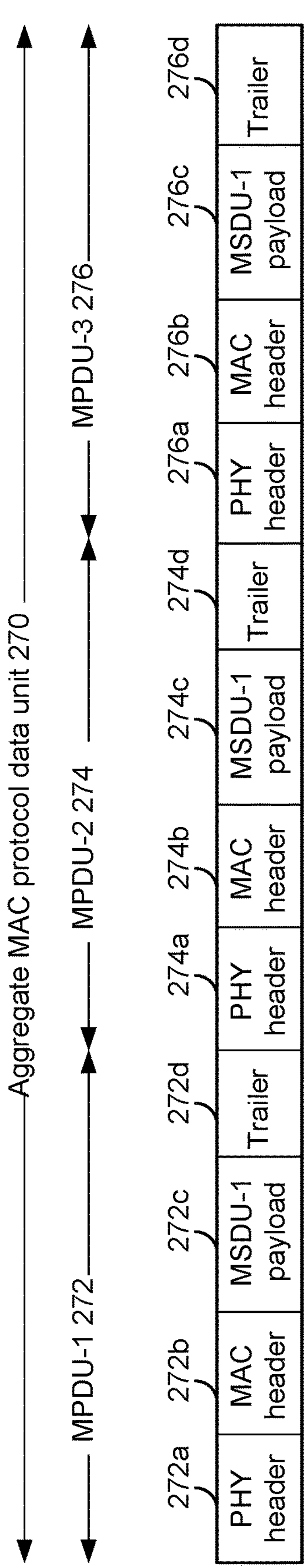
FIG. 2B depicts an aggregate MAC protocol data unit.
Figure 2B:

FIG. 2A depicts the formats for high-efficiency (HE) physical protocol data units (PPDUs), which include HE-SU, HE-MU, HE-ER-SU, HE-TRIG-MU, and HE-NDP frames. In the HE-SU PPDU 252, the format includes a legacy preamble portion and a HE-preamble portion. The legacy preamble includes a legacy short training field (L-STF, 8 us) 252*a*, a legacy long training field (L-LTF, 8 us) 252*b*, a legacy signal field (L-SIG, 4 us) 252*c*, and a repeated legacy signal (RL-SIG, 4 us) 252*d* symbols. The HE-preamble portion includes an HE-SIG-A (8 us) symbol 252*e*, an HE-STF (4 us) symbol 252*f*, and in one case, an HE-SIG-B (4 us/symbol) symbol 254*i*. Following these symbols are a variable number of variable duration HE-LTF symbols 252*g*, a data field 252*h* except for the null data packet (NDP) format, and a packet extension (PE) field 252*j*. The HE-MU PPDU format 254 includes the same symbols as the HE-SU PPDU 252 but has an additional HE-SIG-B symbol 254*i*. The HE-ER-SU PPDU format 256 and the HE-TRIG-MU PPDU 258 have the same symbols as the HE-SU PPDU 252 format, while the HE-NDP format 260 has the same symbols as HE-SU PPDU 252 but no data field.

Trigger frames are control frames sent by an AP that has won the channel and are used to allocate RUs to stations. The RU allocation information is communicated at the medium access control (MAC) layer level in a user information field in the body of a trigger frame. The stations respond to the trigger frame by transmitting a HE-TRIG-MU PPDU 258 in the uplink (UL) direction.

In addition, a trigger frame can solicit a buffer status report from a station. The buffer status report gives information about the buffers in the station. Stations can also deliver buffer status reports in a control field of a frame transmitted to the AP. Doing so is called an unsolicited buffer status report.

Figure 3A:
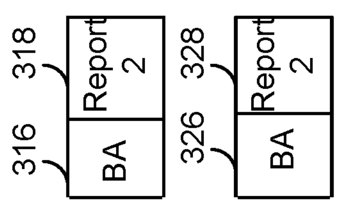
FIG. 3A depicts a report attached to a block acknowledgment frame.
Figure 3A:
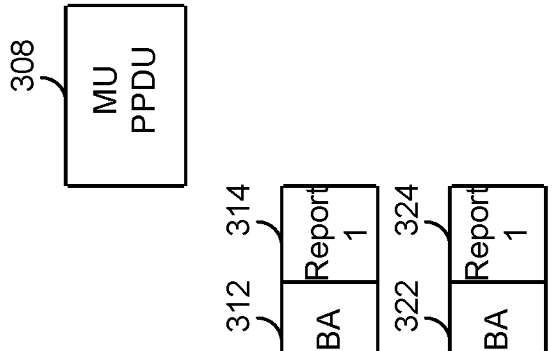
Figure 3A:
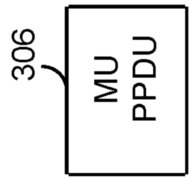
Figure 3A:
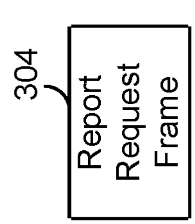
Figure 3A:
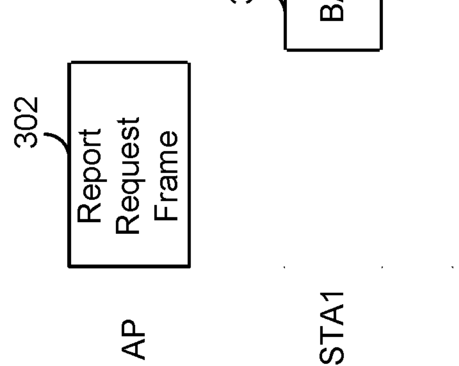

FIG. 3A depicts an aggregate MAC protocol data unit. An aggregate MAC protocol data Unit (AMPDU) 270 enables the packing of many packets into a single transmit opportunity (TXOP), increasing MAC efficiency by reducing the number of TXOPs. In the example shown, the AMPDU includes MPDU-1 272, MPDU-2 274, and MPDU-3 276. Each MPDU has a physical layer header, PHY 272*a*, 274*a*, 276*a*, a medium access control layer header, MAC header 272*b*, 274*b*, 276*b*, a payload 272*c*, 274*c*, 276*c*, and a trailer 272*d*, 274*d*, 276*d*.

The above efficiency improvements include reducing the amount of MAC-layer contention across many client devices by squeezing the client devices' data into a single TXOP and triggering the client devices' uplinks to control that contention.

Even though much of the data plan has been streamlined to avoid extra TXOPs, the management and control planes still rely on dedicated TXOPs where the network polls the client device for information. Much of this can be opportunistically relayed back to the AP on the back of regular data TXOPs to reduce the amount of one-off control/management plane-related traffic.

The Block Acknowledgement (BA) is a ubiquitous frame that follows every data PPDU. It can be relied on as a constant way to transport data between devices actively exchanging data.

FIG. 3A depicts appending a report to a block acknowledge frame, in an embodiment. In one embodiment, an access point (AP) sends a unicast management or action frame 302, 304 to indicate to a station (STA) that it should append a particular type of report to each BA 310, 320 it sends back to the AP. Examples are buffer status reports, neighbor reports, and bandwidth query reports. This management frame may also contain a bitmap that shows a desired list of reports and the frequency at which they should be reported. When the AP sends a downlink (DL) single user (SU) or multi-user (MU) physical layer protocol data unit (PPDU) 306, 308 to STA 1, it requests a BA. STA 1, which received the unicast management frame, appends the previously requested report(s) 314, 318 for STA 1 to BA 312 and BA 316.

Similarly, when the AP sends a PPDU 308 to STA 2, it requests a BA. STA 2 appends the previously requested report 324, 328 to BA 322 and 326. Stations append reports to the BA at the requested frequency for each type of report. Each STA can cycle between different types of requested reports for each BA to do so. It could append nothing to an individual BA if the BAs are frequent and unnecessary to send reports so often.

In another embodiment, there is a field in the preamble of the management frame that can request the specific type of appended report on a per PPDU basis.

In IEEE 802.11ax, the AP can use OFDMA to schedule UL transmissions across multiple STAs at a time. In this mode, individual STAs are assigned their own resource units (RUs) to prevent STAs from interfering with one another. When STAs receive a Trigger Frame from the AP, all STAs that have been scheduled transmit in unison but send data on their own assigned RUs. In this mode, all STAs may transmit for the same length of time (the time of the TXOP).

This means that regardless of how much data an STA has to transmit, it only has access to the RU for the TXOP. Sometimes, the TXOP cannot transmit the data in the STA's buffer. In other cases, the TXOP is much longer than the STA needs. The latter case leads to significant inefficiency. In these cases, 802.11ax allows padding of the unused space after the STA has finished transmitting its payload.

This padding during the unused period of the TXOP may be a waste of the channel (by not transmitting useful data). The embodiments below provide augmentation to the OFDMA TXOP use that allows STAs to utilize the unused (padded) bits for useful purposes, such as sending a requested report. This augmentation to 802.11ax is intended to be proposed to the follow-on to 802.11be (Wi-Fi 8) and potentially future Wi-Fi standards.

Figure 3B:
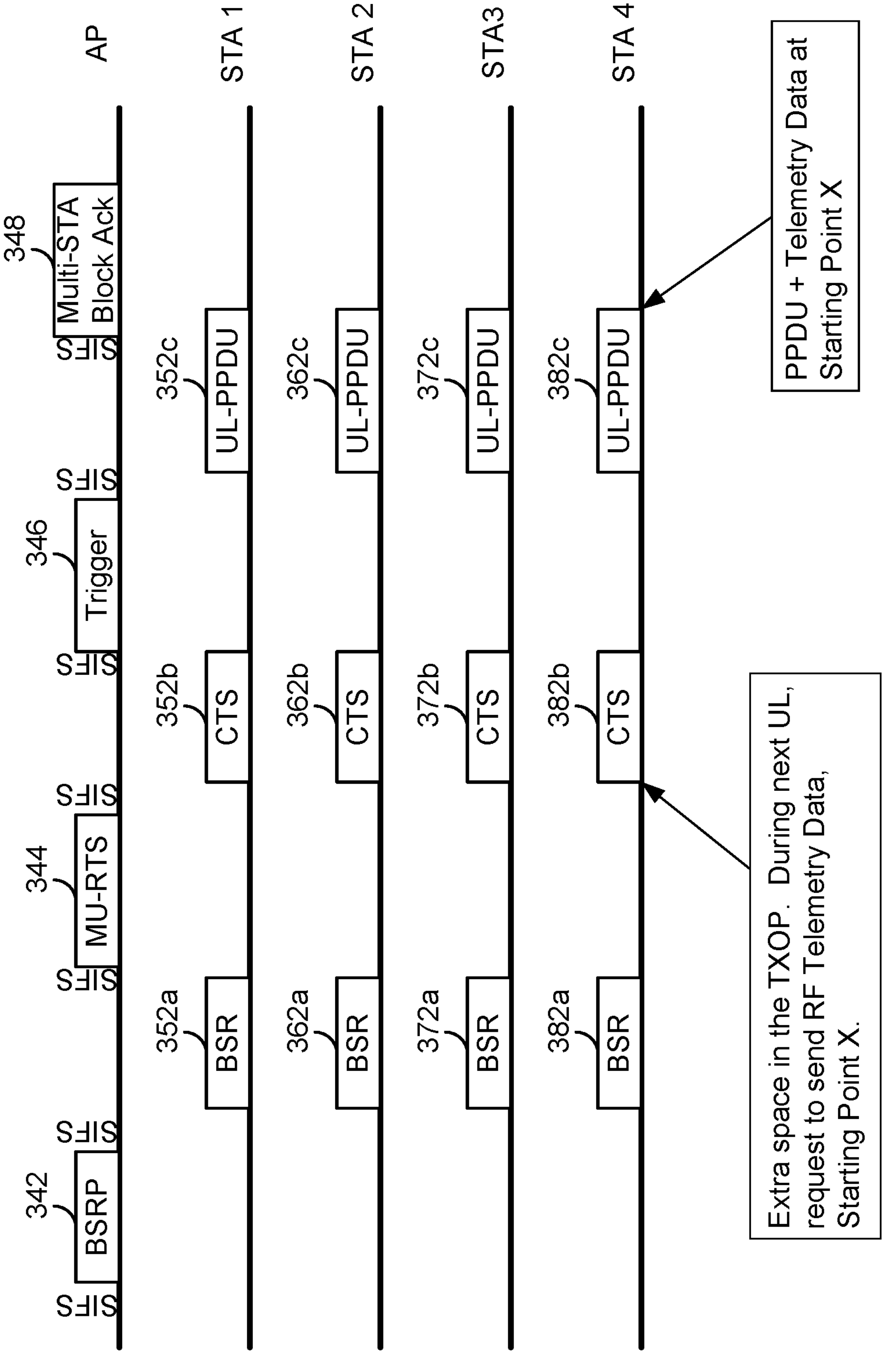
FIG. 3B depicts a report carried by excess capacity in an uplink PPDU.

FIG. 3B depicts providing a report in the spare capacity of a PPDU. In 802.11ax, the AP communicates with STAs using three Trigger Frames. The first trigger frame is the Buffer Status Report Poll (BSRP) 342, which is used to determine how much data is in the buffer of each STA. STA 1, STA 2, STA 3, and STA 4 respond to the AP with a BSR (Buffer Status Report) 352*a*, 362*a*, 372*a*, 382*a*, respectively, which informs the AP how much data is in the buffer. At this point, the AP assigns RUs to the STAs and schedules a TXOP. In one embodiment, all STAs must observe the same TXOP during UL communication.

Next, the AP broadcasts a second Trigger Frame 344 to the STA (the MU-Request to Send (RTS)), which informs the STAs of their RU assignment and the TXOP. Also included in the MU-RTS is a request for information of a particular type sought by the AP from the STAs and how often the information is to be provided by the STA to the AP. Alternatively, the AP notifies the STA or group of STAs as to the type of information it seeks via a management frame such as an action frame.

Before sending the CTS in response to the RTS, the STA calculates the amount of data queued for transmission during the next TXOP versus the actual TXOP budget. If the amount of data is less than the TXOP budget, then the STA can decide to use the remaining budget for other purposes, such as reporting to the AP according to the request in the MU-RTS or management frame.

Next, the STAs inform the AP that they will use the remaining budget for a specific purpose rather than fill it with padding bits. The STAs modify the CTS frame transmitted to the AP by the STA to accomplish this. In this newly modified CTS frame 352*b*, 362*b*, 372*b*, 382*b*, the STA includes one or more Type Codes that tells the AP the type of data contained in the uplink (UL) PPDU 352*c*, 362*c*, 372*c*, 382*c* that will consume the remaining bits, along with the starting point in the UL frame. The UL-PPDU frames are sent in response to a trigger frame 346 and are acknowledged by a multi-station block acknowledge frame 348 from the AP.

The bits that are not used by the data payload during the remaining TXOP budget may be used for various purposes, including: informing the AP of the STA's current total buffer on a per-AC basis (thus removing the need for a BSR or an unsolicited BSR later); additional scheduling requests (Stream Classification Service (SCS) or FastLane Plus (FL+) initial requests or 'give me more/give me less' requests); performance information (e.g., feedback matrix, current number of retries over the last interval (today, this is only a single bit set in the 802.11 frame, meaning the AP doesn't have visibility in this otherwise), etc.); parity bits, to improve the reliability of the payload; telemetry data, such as the STA's RSSI, SNR, etc.; physical location, such as GPS if available; and/or sharing the STAs AP scan list with the AP to be used with Resource Radio Management (RRM) decisions.

For each of these, the STA can use a different Type Code in the CTS, so the AP knows what data it is receiving and how to deal with it.

Figure 4:
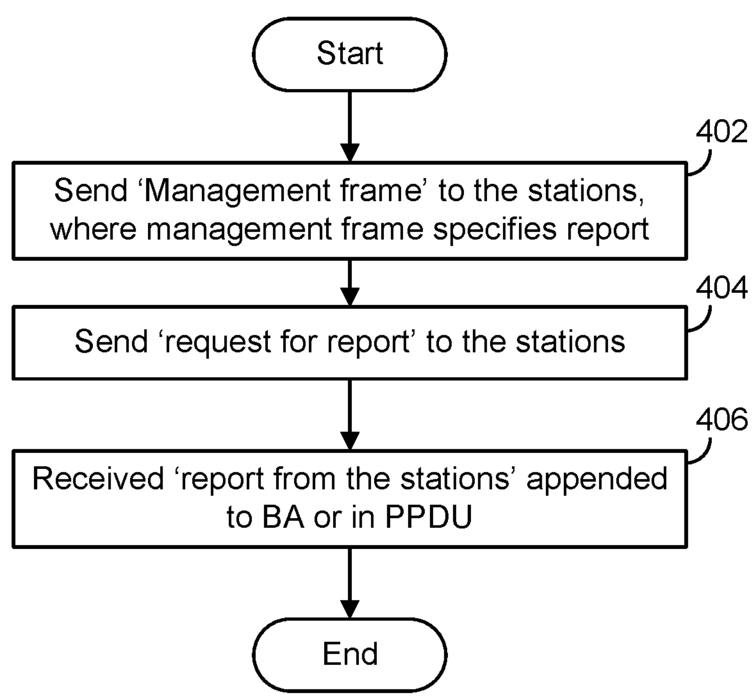
FIG. 4 depicts a flow of operations for an access point obtaining a report from one or more stations, in an embodiment.

FIG. 4 depicts a flow of operations for an access point obtaining a report from one or more stations, in an embodiment. In step 402, the access point sends a management frame to the stations. In step 404, the access point sends a request for the report to the stations, and in step 406, the access point receives the requested report from the station appended to a block acknowledge or in a PPDU.

Figure 5A:
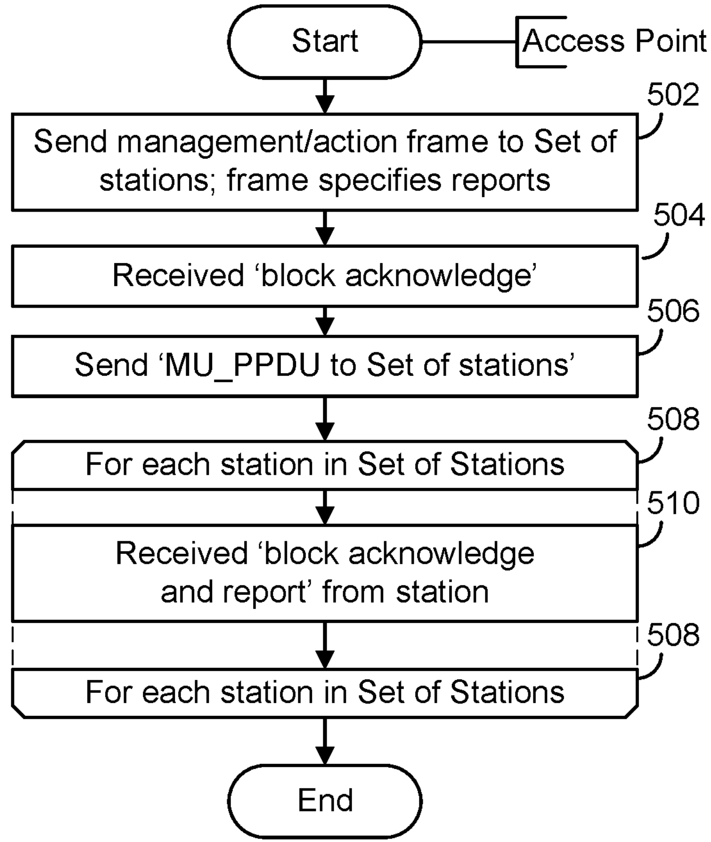
FIG. 5A depicts a flow of operations for an access point obtaining a report appended to a block acknowledge, in an embodiment.

FIG. 5A depicts a flow of operations for an access point obtaining a report appended to a block acknowledge, in an embodiment. In step 502, the access point sends a management or action frame to a set of stations, where the management or action frame specifies one or more reports. In step 504, the access point receives a block acknowledge from each station of the set of stations. In step 506, the access point sends a multi-user PPDU to the set of stations. In step 510, the access point receives a block acknowledge with the requested reports appended to the block acknowledge from each station in the set of stations according to step 508.

Figure 5B:
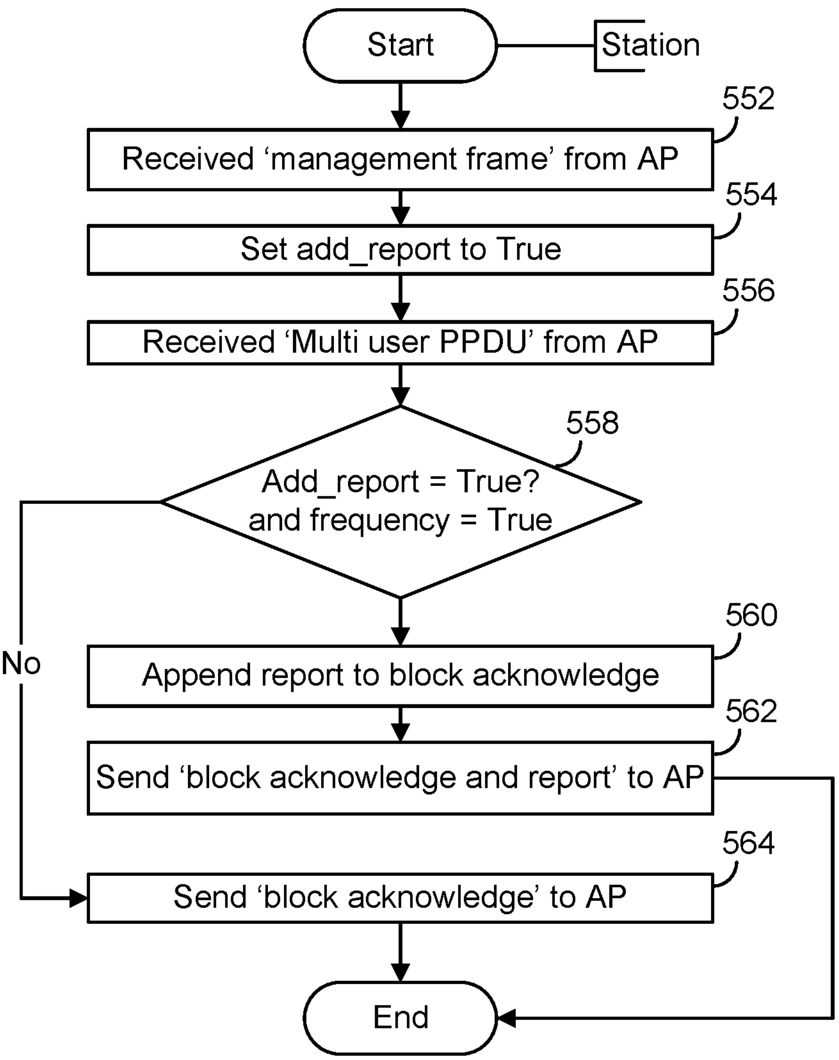
FIG. 5B depicts a flow of operations for a station providing a report appended to a block acknowledge, in an embodiment.

FIG. 5B depicts a flow of operations for a station providing a report appended to a block acknowledge, in an embodiment. In step 552, a station receives a management or action frame from the access point. In step 554, the station sets a flag to true indicating that a report specified in the management or action frame is to be appended to the next block acknowledge. In step 556, the station receives a multi-user PPDU from the access point. In step 558, the station determines whether the flag is set and whether the frequency of providing the report indicates that a report is due. If so, then in step 560, the station appends the specified report to the block acknowledge with the report to the access point and sends, in step 562, the block acknowledge and report to the access point. Otherwise, the station sends in step 564 only the block acknowledge to the access point.

Figure 6A:
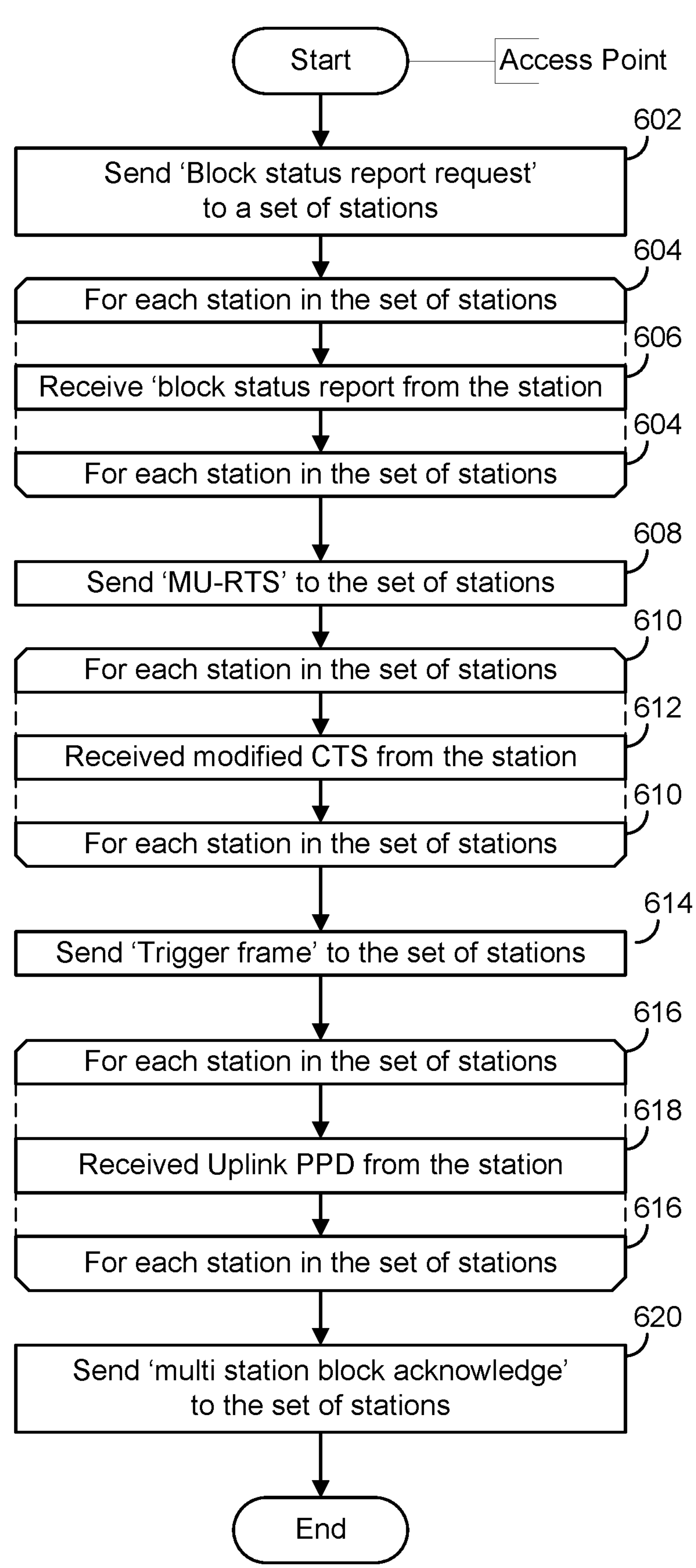
FIG. 6A depicts a flow of operations for an access point obtaining a report in a PPDU, in an embodiment.

FIG. 6A depicts a flow of operations for an access point obtaining a report in a PPDU, in an embodiment. In step 602, the access point sends a block status report request to a set of stations. In step 606, the access point receives a block status report from each station according to step 604. In step 608, the access point sends a multi-user RTS to the set of stations. In step 612, the access point receives a modified CTS from each station according to step 610. In step 614, the access point sends a trigger frame to the set of stations. In step 618, the access point receives an uplink PPDU from each station according to step 616. In step 620, the access point sends a block acknowledge to the set of stations.

Figure 6B:
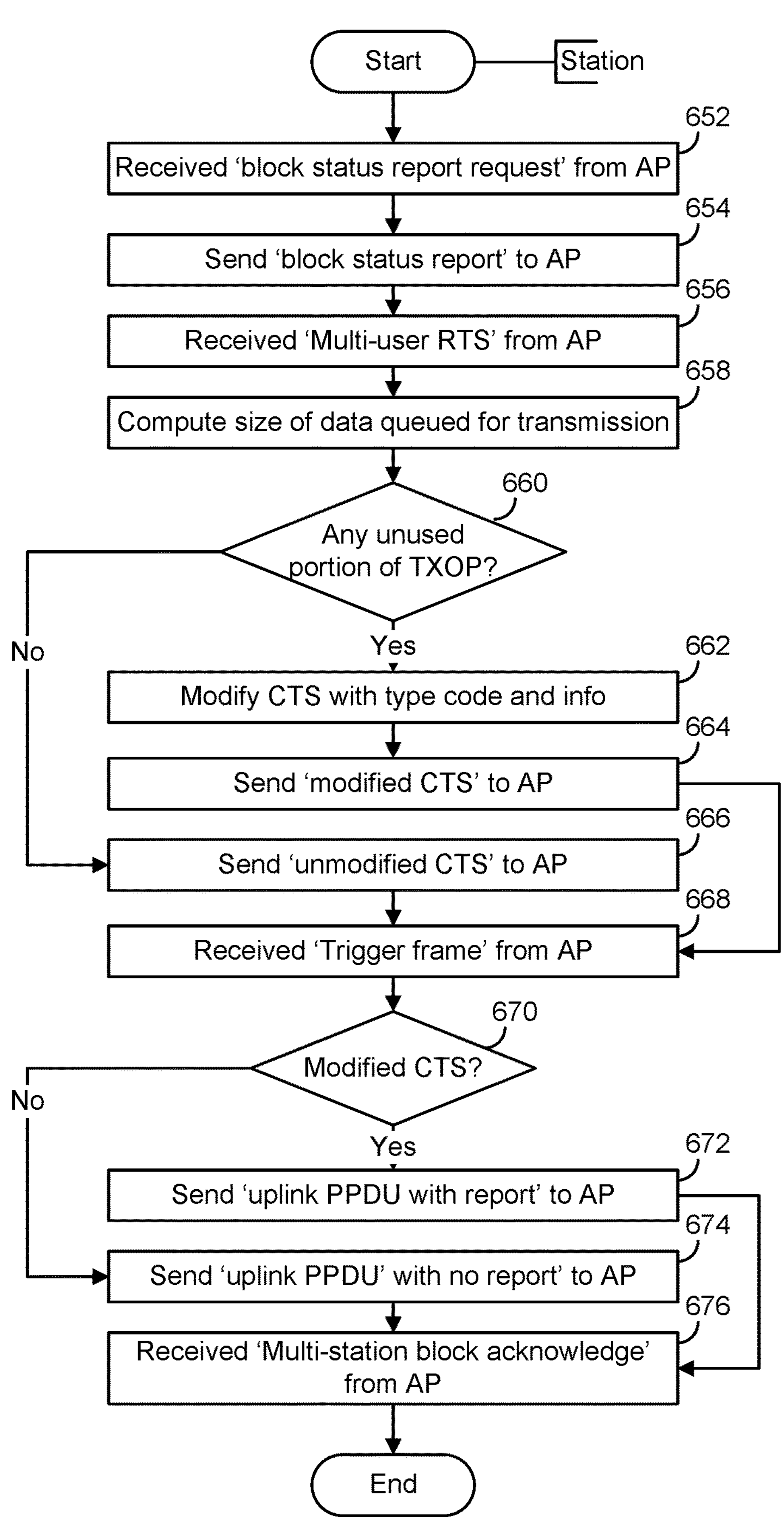
FIG. 6B depicts a flow of operations for a station providing a report in a PPDU, in an embodiment.

FIG. 6B depicts a flow of operations for a station providing a report in a PPDU, in an embodiment. In step 652, the station receives a block status report request from the AP. In step 654, the station sends the block status report to the AP. In step 656, the station receives a multi-user RTS from the AP. In step 658, the station computes the data queue size for the next TXOP and, in step 660, determines whether any portion of the next TXOP is unused. If so, then the station modifies a CTS frame in step 662 and sends the modified CTS frame to the AP in step 664. If no portion of the next TXOP is unused, then the station sends, in step 666, an unmodified CTS to the AP. In step 668, the station receives a trigger frame from the access point. If the station sent a modified CTS frame to the access point as determined in step 670, then the station sends an uplink PPDU with a requested report to the AP in step 672. If the unmodified CTS was sent, then the station sends, in step 674, an uplink PPDU with no report to the AP. In step 676, the station receives a multi-station block acknowledge from the AP that the PPDU was correctly received.

In sum, the embodiments herein address the well-known problem of inefficient use of STAs because they do not fully use their TXOP. When an AP issues a trigger frame, all transmitting STAs obey the same TXOP. However, not all of them require the full TXOP. This disclosure presents techniques to pad the unused part of the TXOP to send useful data to the AP.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer-readable program code embodied thereon. Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

sending a management frame to a station from an access point, the management frame specifying one or more reports, the one or more reports regarding operation of the station connected to the access point;

sending a request for the one or more reports specified in the management frame;

receiving the one or more reports from the station at the access point, wherein the one or more reports are included in a spare capacity of a physical protocol data unit (PPDU) that occurs when an amount of data queued to be transmitted in the PPDU is less than a budgeted amount for the PPDU;

sending a request-to-send (RTS) frame from the access point to the station; and receiving, in response to the RTS frame, a clear-to-send (CTS) frame that contains information specifying types of the one or more reports, wherein the CTS frame includes a report of a spare capacity of the PPDU from the station receiving the management frame, wherein the spare capacity is determined by the station based on the amount of data queued to be transmitted during the PPDU being less than the budgeted amount for the PPDU.

2. The method of claim 1, further comprising:

receiving an aggregate PPDU from a plurality of stations at the access point, each aggregate PPDU carrying a report pertaining to one of the plurality of stations; and responding to the aggregate PPDU with a multi-station block acknowledge frame.

3. The method of claim 1, wherein the PPDU is transmitted or received by orthogonal frequency division multiple access (OFDMA) modulation.

4. The method of claim 1, further comprising:

providing the one or more reports to a control plane for the access point.

5. The method of claim 1, wherein the one or more reports include one of:

a buffer status report, a neighbor report, a bandwidth report, scheduling requests, telemetry data, and physical location.

6. A system for providing information to an access point, the system comprising:

an access point; and one or more stations coupled to the access point;

wherein the access point is configured to:

send a management frame to a station, the management frame specifying one or more reports, the one or more reports regarding operation of the station connected to the access point;

send a request for the one or more reports specified in the management frame;

receive the one or more reports from the station, wherein the one or more reports are included in a spare capacity of a physical protocol data unit (PPDU) that occurs when an amount of data queued to be transmitted in the PPDU is less than a budgeted amount for the PPDU sent by the station to the access point;

send a request-to-send (RTS) frame to the station; and receive, in response to the RTS frame, a clear-to-send (CTS) frame that contains information specifying types of the one or more reports, wherein the CTS frame includes a report of a spare capacity of the PPDU from the station receiving the management frame, wherein the spare capacity is determined by the station based on the amount of data queued to be transmitted during the PPDU being less than the budgeted amount for the PPDU.

7. The system of claim 6, wherein the access point is configured to:

receive an aggregate PPDU from a plurality of stations, the aggregate PPDU of each station carrying a report pertaining to one of the plurality of stations; and respond to the aggregate PPDU with a multi-station block acknowledge frame.

8. The system of claim 6, wherein the PPDU is transmitted or received by orthogonal frequency division multiple access (OFDMA) modulation.

9. The system of claim 6, wherein the access point is configured to provide the one or more reports to a control plane for the access point.

10. The system of claim 6, wherein the one or more reports include one of:

a buffer status report, a neighbor report, a bandwidth report, scheduling requests, telemetry data, and physical location.

11. A non-transitory computer-readable medium encoding instructions, which, when executed by a processor of an access point coupled to a wireless medium, cause the access point to:

send a management frame to a station from the access point, the management frame specifying one or more reports, the one or more reports regarding operation of the station connected to the access point;

send a request for the one or more reports specified in the management frame;

receive the one or more reports from the station at the access point, wherein the one or more reports are included in a spare capacity of a physical protocol data unit (PPDU) that occurs when an amount of data queued to be transmitted in the PPDU is less than a budgeted amount for the PPDU;

send a request-to-send (RTS) frame to the station; and receive, in response to the RTS frame, a clear-to-send (CTS) frame that contains information specifying types of the one or more reports, wherein the CTS frame includes a report of a spare capacity of the PPDU from the station receiving the management frame, wherein the spare capacity is determined by the station based on the amount of data queued to be transmitted during the PPDU being less than the budgeted amount for the PPDU.

12. The non-transitory computer-readable medium of claim 11, wherein the instructions cause the access point to:

receive an aggregate PPDU from a plurality of stations, each aggregate PPDU carrying a report pertaining to one of the plurality of stations; and respond to the aggregate PPDU with a multi-station block acknowledge frame.

13. The non-transitory computer-readable medium of claim 11, wherein the PPDU is transmitted or received by orthogonal frequency division multiple access (OFDMA) modulation.

14. The non-transitory computer-readable medium of claim 11, wherein the instructions cause the access point to provide the one or more reports to a control plane for the access point.

* * * * *